US008858833B2

(12) United States Patent
Chi et al.

(10) Patent No.: US 8,858,833 B2
(45) Date of Patent: *Oct. 14, 2014

(54) METHOD FOR PREPARING RARE-EARTH DOPED FLUORIDE NANOPARTICLES

(75) Inventors: Changzai Chi, Hockessin, DE (US); Daniel Albert Green, Moylan, PA (US); Kurt Richard Mikeska, Hockessin, DE (US); Lee A. Silverman, Newark, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 1083 days.

This patent is subject to a terminal disclaimer.

(21) Appl. No.: 11/443,911

(22) Filed: May 31, 2006

(65) Prior Publication Data
US 2007/0108413 A1 May 17, 2007

Related U.S. Application Data

(60) Provisional application No. 60/687,646, filed on Jun. 3, 2005.

(51) Int. Cl.
| | |
|---|---|
| C09K 11/08 | (2006.01) |
| C09K 11/61 | (2006.01) |
| C01F 1/00 | (2006.01) |
| C01F 5/26 | (2006.01) |
| C01F 11/20 | (2006.01) |
| C01D 3/02 | (2006.01) |
| C01F 5/28 | (2006.01) |
| C01F 11/22 | (2006.01) |
| C01F 17/00 | (2006.01) |
| C09K 11/77 | (2006.01) |
| B82Y 30/00 | (2011.01) |

(52) U.S. Cl.
CPC ......... C01F 17/0031 (2013.01); *C01P 2004/52* (2013.01); *C01P 2004/64* (2013.01); *C01P 2002/84* (2013.01); *C01P 2002/52* (2013.01); C09K 11/7791 (2013.01); C09K 11/7733 (2013.01); C09K 11/7757 (2013.01); C01F 11/22 (2013.01); C09K 11/7705 (2013.01); C09K 11/7748 (2013.01); B82Y 30/00 (2013.01); C01F 17/0062 (2013.01); *C01P 2004/04* (2013.01)
USPC ..................... 252/301.4 H; 423/163; 423/490

(58) Field of Classification Search
USPC ....... 252/301.4 H; 423/38, 46, 51, 71, 94, 99, 423/126, 147, 163, 490
See application file for complete search history.

(56) References Cited

U.S. PATENT DOCUMENTS

| | | | | |
|---|---|---|---|---|
| 5,525,377 A | * | 6/1996 | Gallagher et al. | ............ 427/512 |
| 2003/0032192 A1 | | 2/2003 | Haubold et al. | |
| 2004/0174917 A1 | * | 9/2004 | Riman et al. | .................... 372/43 |

FOREIGN PATENT DOCUMENTS

| | | | |
|---|---|---|---|
| WO | WO03/087259 | * | 4/2003 |

OTHER PUBLICATIONS

Faulques. Synthesis fabrication and photoluminescence of Caf2 doped with rare earth ions. Journal of Fluorescence vol. 8, No. 4. pp. 283-287.*

(Continued)

*Primary Examiner* — Matthew E Hoban

(57) ABSTRACT

The invention is directed to a process of combining an aqueous solution of a fluoride with an aqueous solution of a host multi-valent metal salt and an aqueous solution of a salt forming a reactant mixture resulting in a precipitate of aqueously insoluble rare-earth doped multi-valent metal fluoride nanoparticles.

7 Claims, 13 Drawing Sheets

(56) References Cited

OTHER PUBLICATIONS

Bender et al., Synthesis and Fluorescence of Neodymium-Doped Barium Fluoride nanoparticles, Chem. Mater., 2000, vol. 12:1969-1976.

Wang et. al., Synthesis and Luminescence Behavior of Eu 3+-Doped CaF2 Nanoparticles, Solid State Communications, 2005, vol. 133:775-779.

Wu et. al., Synthesis and Ionic Conductivity of Nanophase. Mat. Res. Soc. Symp. Proc., 1993, vol. 286:27-32.

Stouwdam et. al., Near-Infrared Emission of Redispersible Er3+, Nd3+, and Ho3+ Doped LaF3 Nanoparticles, Nano Lett., 2002, vol. 2:733-737.

Knowles-Van Cappellen et. al., Probing the Charge of Reactive Sites at the Mineral—Water Interface: Effect of Ionic Strength on Crystal Growth Kinetics of Fluorite, Geochim. Cosmochim, Acta, 1997, vol. 61:1871-1877.

Knowles-Van Cappellen, The Effects of Ionic Strength and Aggregation on Crystal Growth Kinetics: An Application of Photon Correlation Spectroscopy, M.S. Thesis, 1995, pp. 1-105.

* cited by examiner

METHOD FOR PREPARING RARE-EARTH DOPED FLUORIDE NANOPARTICLES

FIELD OF THE INVENTION

The present invention provides an aqueous process for preparing rare earth-doped host multi-valent metal fluoride nanoparticles. The process comprises the combination of aqueous solutions of soluble salts to form insoluble rare-earth-doped host multi-valent metal fluorides.

BACKGROUND OF THE INVENTION

Several references describing methods for controlling the size of flouride nanoparticles follow. Bender et al., Chem. Mater. 2000, 12, 1969-1076, discloses a process for preparing Nd-doped $BaF_2$ nanoparticles by reverse microemulsion technology. Bender expressly states that aqueous salt solutions such as 0.06 M $Ba^{+2}$, produce particles smaller than 100 nm while concentrations of about 0.3 M $Ba^{+2}$ resulting in particles larger than 100 nm. Luminescing particles are disclosed. Bender discloses a decrease in lattice parameter for $BaF_2$ nanoparticles doped with Nd.

Wang et al., Solid State Communications 133 (2005), 775-779, discloses a process for preparing 15-20 nm Eu-doped $CaF_2$ particles in ethanol. Wang expressly teaches away from employing an aqueous reaction medium.

Wu et al., Mat. Res. Soc. Symp. Proc. 286, 27-32 (1993) disclose that $CaF_2$ particles produced by a vapor phase condensation process are characterized by an average particle size of 16 nm while $Ca_{0.75}La_{0.25}F_{2.25}$ particles prepared by the same process were characterized by average diameter of 11 nm.

Stouwdam et al., Nano Lett. 2(7) (2002), 733-737, discloses synthesis of rare-earth doped $LaF_3$ in ethanol/water solution incorporating a surfactant to control particle size. The resulting produced incorporates the surfactant. 5-10 nm particles are prepared.

Haubold et al, U.S. Patent Publication 2003/0032192, discloses a broad range of doped fluoride compositions prepared employing organic solutions at temperatures in the range of 200-250° C. 30 nm particles are disclosed. The organic solvent employed degrades and acts as a particle-size controlling surfactant.

Knowles-van Cappellen et al., Geochim. Cosmochim. Acta 61(9) 1871-1877 (1997), discloses preparation of 214±21 nm particles by combining in aqueous solution equal volumes of 0.1 M $Ca(NO_3)_2$ and 0.2 M of NaF. Knowles-van Cappellen is silent regarding doped particles.

The references teach methods for preparation of mutivalent fluorides, doped and undoped, with particle sizes in the range of about 2 to 500 nm. The teachings are confined to non-aqueous reaction media, or at least water/alcohol. The methods teach various means for controlling the particle size produced. For example, Bender teaches that higher concentrations of reactants lead to larger particles. Others show that the presence of a rare-earth dopant decreases particle size. Others, Stouwdam, op.cit., and Haubold, op. cit., employ surfactants to control particle size.

The present invention represents a breakthrough in the technology of preparing rare-earth doped multi-valent metal fluoride nanoparticles. It is conducted by combining solutions of aqueously soluble salts, preferably at room temperature, and separation of the product by ordinary means including flocculation, filtration, and centrifugation. The rare earth doped particles prepared according to the present invention exhibit luminescence giving them broad utility in many fields while the small particle size reduces light scattering and haze. Applications include use in forming solid state lasers, preparation of optical amplifiers, detectors, coatings, paints and other surface treatment applications.

SUMMARY OF THE INVENTION

The present invention is directed to a process comprising combining at least 0.1 normal aqueous solution of a fluoride selected from the group consisting of alkali metal fluorides, ammonium fluoride, hydrogen fluoride, and mixtures thereof, with at least 0.1 normal aqueous solution of a host multi-valent metal salt, comprising a host multi-valent metal cation and an anion, and an aqueous solution of a salt comprising a rare earth metal cation dopant, the amount of the rare-earth dopant being in the range of 0.1 to 25 mol-% of the molar concentration of the host multi-valent metal cation, forming a reactant mixture from which is formed a precipitate of aqueously insoluble rare-earth doped multi-valent metal fluoride nanoparticles, the rare-earth doped multi-valent metal fluoride being characterized by an aqueous solubility of less than 0.1 g/100 g of water.

DETAILED DESCRIPTION

Figure 1:
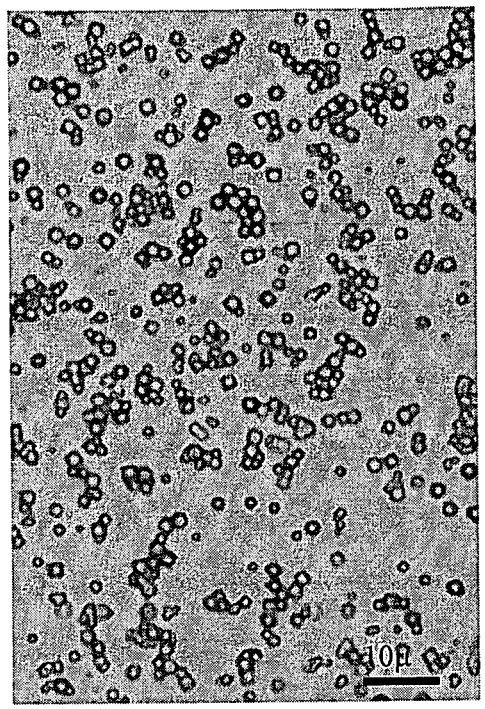
FIG. 1 is an optical micrograph of the undoped $CaF_2$ particles prepared in Comparative Example 15.

For the purposes of the present invention, the term "nanoparticles" shall be understood to refer to an ensemble of particles wherein at least 50% of the particles on a number basis (designated "d50") are smaller than 500 nm in their largest dimension. In the preferred embodiments hereof, d50 is less than 100 nm.

The actual value of d50 which will be realized for any given concentration of starting ingredients depends upon the reaction specifics. Factors which affect the value of d50 at a fixed concentration level are: the chemical identity of the reactants, the presence and concentration of dopant, and the solubility of the host multi-valent metal fluoride salt. Thus, in the practice of the invention, it may be necessary to make several small adjustments to concentrations of the specific starting materials in order to zero-in on the desired particle size for the given host multi-valent metal fluoride at the given dopant level.

Depending upon the particular use to which the nanoparticles are intended, d50 will need to be determined with varying degrees of precision. In many embodiments, it is only necessary that an upper bound for the value of d50 be determined, and so long as that upper bound is below some pre-established maximum value, further precision is not required. For example, light scattering methods such as photon correlation spectroscopy, are unable to distinguish actual particle size from aggregates of particles, thus giving considerable weight to large agglomerates, and, as a result, producing a value for d50 which exhibits error on the high side. If the pre-established maximum value for d50 were 200 nm, and a light scattering result showed d50 to be less than 200 nm, that would suffice to establish that the particles in hand meet the requirements of the application, and no further precision would be needed. In other instances, d50 may be estimated by visual inspection of electron micrographs. Higher precision can be obtained using statistical image analysis techniques on the same micrographs.

Further for the purposes of the present invention the term "host multi-valent metal cation" refers to the cation which forms the host fluoride compound which is doped according to the process hereof with a rare earth dopant. The "host multi-valent metal cation" will be present as a soluble ion in the starting solution of the process hereof. "Host multi-valent metal salt" refers to the aqueously soluble starting salt of the process hereof the cation of which is the host multi-valent metal cation herein above defined.

The particles produced according to the present invention comprise a crystalline or semi-crystalline host material and a dopant. The host material is a host multi-valent metallic fluoride characterized by an aqueous solubility of less than 0.1 g/100 g of water. The dopant is a rare-earth cation which occupies specific lattice sites in the crystalline structure of the host material.

According to the process of the present invention aqueous solutions of a soluble fluoride, a soluble host multi-valent metal salt, and a soluble rare-earth salt are combined at room temperature to produce a highly insoluble rare-earth-doped host multi-valent metal fluoride. The reaction in aqueous solution of the soluble fluoride with the soluble host multi-valent metal cation and rare earth cation is very rapid. The low solubility of the rare-earth-doped host multi-valent fluoride salt thereby produced is the key to the utility of the process. Precipitation occurs so quickly in the process of the invention that there is little time for crystal growth after nucleation.

According to the present invention an aqueous solution of a fluoride selected from alkali metal fluorides, ammonium fluoride, hydrogen fluoride, or mixtures thereof is combined with an aqueous solution of host multi-valent metal salt and an aqueous solution of a rare earth metal salt. The host multi-valent metal cation of the host multi-valent metal salt may be any host multi-valent metal cation derived from alkaline earth and transition metals. Any such host multi-valent metal cation may be employed in the process hereof with the proviso that the corresponding host multi-valent metal fluoride so produced is characterized by an aqueous solubility of less than 0.1 g/100 g at room temperature.

Aqueous solubility of inorganic fluorides is available from a number of sources, including the well-known CRC *Handbook of Chemistry and Physics*, 8$^{th}$ Edition. Fluorides which as are listed as having solubility below 0.1 g/100 g water or indicated to be "insoluble" in water are suitable for preparation as nanoparticles according to the process of the invention. Many transition metal fluorides are soluble in water, and many are reactive with water, and are therefore not suitable for preparation using this method.

Suitable host multi-valent metal cations for use in the present invention include but are not limited to $Ca^{+2}$, $Mg^{+2}$, $Sr^{+2}$, $Y^{+3}$, $La^{+3}$, $Ac^{+3}$, $Cr^{+3}$, $Mo^{+3}$, $Ir^{+3}$, $Cu^{+2}$, $Ga^{+3}$ and $Pb^{+2}$, as well as the rare-earths $Ce^{+3}$, $Nd^{+3}$, $Eu^{+3}$, $Er^{+3}$, $Yb^{+3}$, and $Lu^{+3}$. Preferred are $Ca^{+2}$ and $La^{+3}$. In the cases where the host multi-valent metal cation is a rare-earth, the process of the invention provides for a rare-earth fluoride nanoparticle doped with a second rare-earth. Any rare-earth element is available as a dopant according to the process of the invention, regardless of the degree of solubility of the fluoride thereof. Thus, the rare earth fluorides of Ce, Nd, Eu, Er, Yb, and Lu are suitable for use as host materials according to the present invention, while all rare-earths are suitable for use as dopants. However, the host cation and the dopant cannot be the same element.

The term "rare-earth" refers to the members of the Lanthanide Series in the periodic table, namely La, Ce, Pr, Nd, Pm, Sm, Eu, Gd, Tb, Dy, Ho, Er, Tm, Yb, and Lu.

In the preferred embodiments hereof, use of $Ca^{+2}$ and $La^{+3}$ salts results in particles characterized by d50<100 nm.

As a further embodiment of the present invention, a combination of soluble host multi-valent metal cations is employed in the process hereof to prepare a rare-earth doped solid state solution of the two host multi-valent fluorides.

Preferred anions for the soluble host multi-valent metal salt are chloride, nitrate, sulphate, hydroxide, acetate, carbonates, phosphates, bromides, and hydrates thereof. Preferably the aqueously soluble fluoride is NaF, KF, or $NH_4F$, and the host multi-valent metal cation is $Ca^{+2}$ in the form of $CaCl_2$, $Ca(NO_3)_2$, or $CaSO_4$. According to the present invention, the concentration of the host multi-valent metal salt is at least 0.1 normal, preferably 0.8 normal. Concentration of the soluble fluoride salt is at least 0.1 normal, preferably approximately the same as that of the host multi-valent metal salt, most preferably 0.8 normal. The absolute amount of the rare-earth cation added to the reaction mixture should not exceed 25 mol-% of the host multi-valent metal cation present.

It is observed in the practice of the present invention that increasing the concentration of the rare-earth dopant decreases the size of the particle produced according to the present invention.

It is further observed in the practice of the invention, that use of an alkali metal fluoride in combination with certain host multi-valent metal cations results in a mixture of doped fluorides. In Example 12, $NH_4F$ is combined with $MgCl_2$ and $TbCl_3$, resulting in a mixture of Tb-doped $NaMgF_3$ and Tb-doped $MgF_2$. This problem can be remedied by employing $NH_4^+$ in place of an alkali metal in the process hereof. For that reason $NH_4F$ is a preferred starting material if there is any question about undesirably contaminating the pure fluoride with the alkali-containing contaminant. In the most preferred embodiment hereof, $NH_4F$ is combined with $CaCl_2$, $ErCl_3$, and $YbCl_3$, with the resultant product being pure Er and Yb-doped $CaF_2$.

The process of the present invention is also applicable to the preparation of nano-scale fluoride salts which are undoped. For instance, the process of the present invention can be used to prepare nano-scale particles of undoped $CaF_2$.

Soluble salt starting materials need only be soluble enough to form aqueous solutions of the desired concentrations for the purposes of the present invention. From the standpoint of the present invention, a salt is said to be aqueously soluble if a solution of the desired concentration can be formed from it.

The ingredients are combined together in the space of a few minutes, and then allowed to react while being stirred for about 30 minutes. The pH of the reaction mixture is preferably maintained close to neutral, but a pH range from about 1 to 11 is acceptable. Following reaction, the product may be conveniently separated by centrifugation and decanting of the supernatant liquid. The isolated "wet cake" so produced may then be redispersed in water (or organic solvents by a solvent exchange process) by mixing with liquid and subjecting the mixture to ultrasonic agitation for a period of 5-30 minutes. The dispersed particles are then in form well-suited to use in coatings and the like. For dispersion in non-polar solvents, it may be required to combine the particles produced with surfactants, as taught in the art.

Other suitable methods of separating the precipitate include ion exchange, dialysis and electrodialysis substantially eliminates all salts produced in the process. Further methods, to separate and concentrate the sample, include evaporation of water, centrifugation, ultrafiltration, electro-decantation. A preferred procedure is to employ ion exchange resins to remove soluble salt residues followed by evaporation to concentrate the colloidal sol produced in the process hereof.

The reaction may be effected batch-wise or continuously. In a batch process, the solutions of the host multi-valent metal salt and any rare-earth dopant salt are first mixed together, and the resulting reactant mixture is then combined in a vessel with the soluble fluoride salt reactant, preferably while stirring. In a continuous process, the rare-earth dopant and host multi-valent metal salts are combined to form a first continuous feed stream and the soluble fluoride solution forms a second continuous feed stream. The two feed streams are fed continuously and simultaneously to a mixing chamber wherein they are vigorously mixed followed by discharge to a separation stage wherein the precipitate formed is separated by means herein described, or any means conventionally employed in the art for separating a fine precipitate from a suspension thereof.

It is preferred that the nanoparticles prepared in the process of the invention be subject to water washing in order to remove any residual water soluble starting materials. Dispersing in water followed by centrifugation is one effective method.

In the process of the present invention it is preferred to combine the dopant rare earth salt and the host multi-valent metal salt before combining with the fluoride. The combination of the mixed salts with the fluoride may be effected by slowly adding the mixed salt solutions to the fluoride solution over period of several minutes, or rapidly combining the solutions, in less than a minute. The combination may be effected in a vessel, or it may be effected on a continuous feed basis to a mixing chamber. Any difference in result attributable to whether the dopant rare-earth and host multi-valent metal mixed salt solution is added to the fluoride solution, or the fluoride solution is added to the mixed salt solution appears to be small or negligible. See Examples 5 and 9 below.

The resulting particles exhibit luminescence when subject to suitable optical excitation. It has been found that thermal post-treatment to about 400° C. or 800° C. may alter certain luminescent properties, in some cases, enhancing luminosity or lifetime.

The invention hereof is further described in, but not limited to, the following specific embodiments.

EXAMPLES

In the examples following, NaF was obtained in solid form from J.T. Baker Reagents. CaCl2.2H2O was obtained from EM Sciences. MgCl2.6H2O was obtained from EMD. All other reagents were obtained from Aldrich Chemical Company.

The fluorescence spectra in the examples below were determined using a Jobin-Yvon Spex Fluorolog spectrofluorimeter. A 450 W Xe lamp was used as the excitation source. Gratings blazed at 330 nm with 1200 grooves/mm were used in the excitation monochromator. Gratings blazed at 500 nm with 1200 grooves/mm were used in the emission monochromator. A dry powder sample was loaded into a 15 mm long by 5 mm diameter quartz tube. The powder was tamped down to provide a smooth sample surface and the ends of the tube were sealed either with epoxy or cotton plugs. The sample tube was then loaded in a standard Jobin-Yvon sample holder adapted to hold these small tubes. Sample luminescence was measured from the front face of the tube, with an angle of 150 between the excitation and emission beams. A 400 nm low-pass filter was used to prevent the primary excitation beam in second or higher order of the emission monochromator from interfering with the spectral results. Excitation and emission spectrometer bandwidths were 1 nm; spectrum step size was 1 nm; integration time was 0.1 second per data point. Data was corrected for the excitation Xe lamp intensity. Quantum efficiencies were calculated based upon comparisons to known values for some standard phosphors. The standard phosphor spectra were collected under the same conditions as the sample spectra.

Examples 1-3

Figure 4:
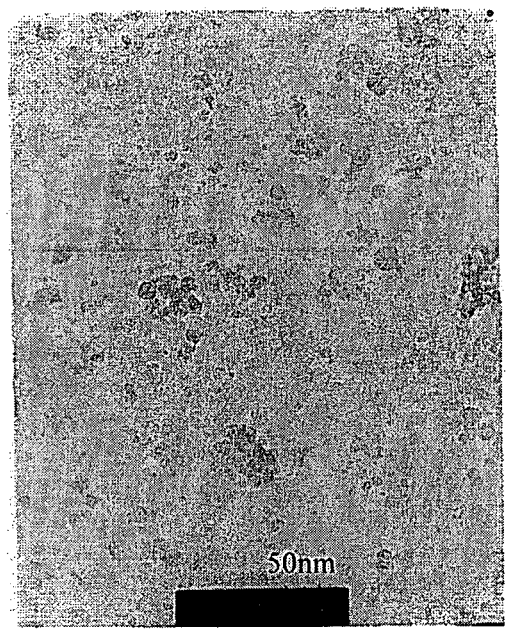
FIG. 4 is a transmission electron micrograph of the Er-doped $CaF_2$ particles prepared in Example 3.

0.4 M $CaCl_2$ solution was mixed with 0.4 M $ErCl_3$ solution in a 250 ml polycarbonate flask. The amounts of $CaCl_2$ solution and $ErCl_3$ solution in each example are shown in Table 1. Each indicated mixed metal chloride solution so prepared was then slowly added with vigorous stirring into another 250 ml polycarbonate flask containing the amounts of 0.8 M NaF solution also shown in Table 1. The addition was completed in four minutes. The resulting colloidal suspension was stirred for 30 min followed by ultrasonic agitation for 20 min using a model 1500 Branson ultrasonic bath. 1 ml of the ultrasonically agitated dispersion was diluted to 30 ml by adding deionized water. The resultant diluted, well-dispersed specimen was analyzed by transmission electron microscopy (TEM). The particle size of Example 3 was in the range of 10 to 40 nm as shown by TEM (FIG. 4). By visual estimation, d50 was less than 40 nm.

TABLE 1

| Example | Er % | 0.4 M $CaCl_2$ solution (ml) | 0.4 M $ErCl_3$ solution (ml) | 0.8 M NaF solution (ml) |
| --- | --- | --- | --- | --- |
| 1 | 5% | 47.5 | 2.5 | 51.25 |
| 2 | 10% | 45 | 5 | 52.5 |
| 3 | 20% | 40 | 10 | 55 |

The remainder of each colloidal sol was then centrifuged at 7000 rpm for 30 min. The supernatant liquid was decanted.

Figure 3:
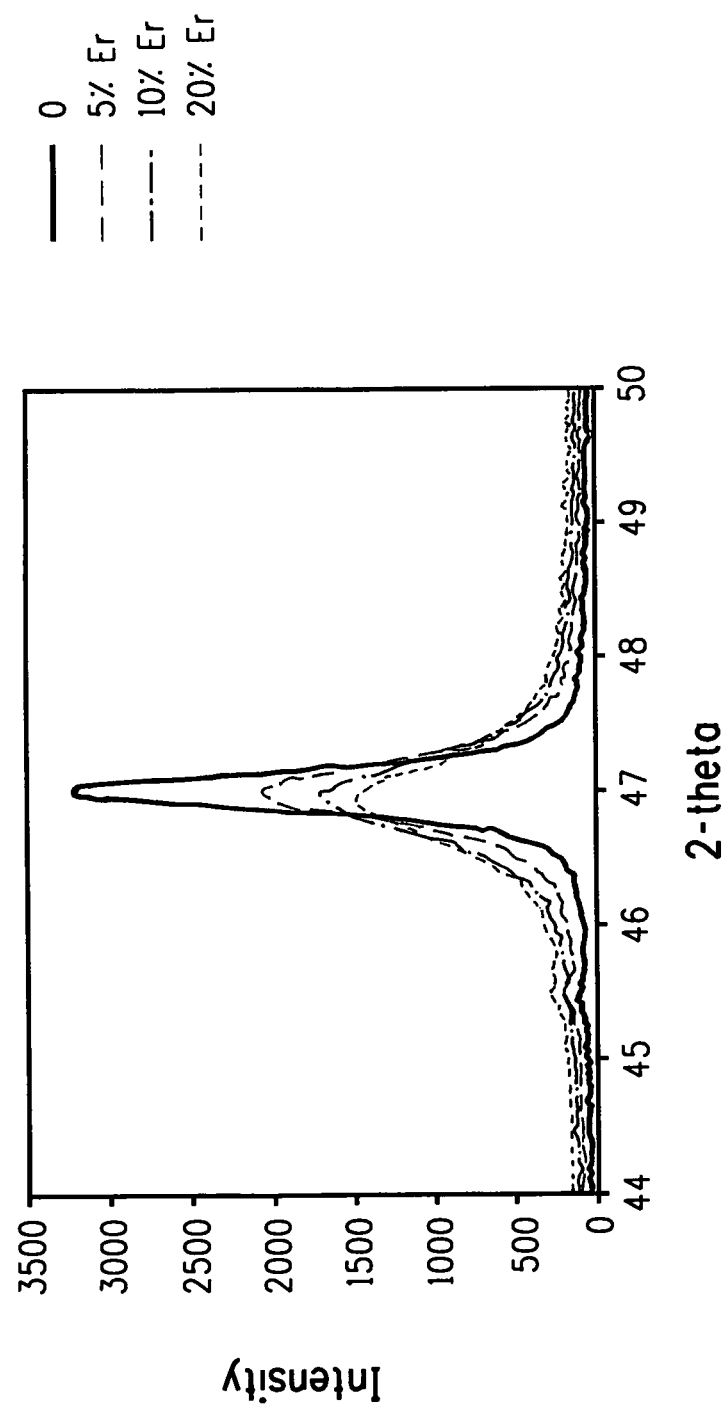
FIG. 3 depicts x-ray diffraction data for Comparative Example 16 and Examples 1-3.

Each wet cake was collected in a glass jar and dried at 135° C. under vacuum with a nitrogen purge. The samples were then ground into powder using a mortar and pestle, and analyzed by XRD. The results are shown in FIG. 3. $CaF_2$ crystallite size was calculated using the Scherrer Equation (Cullity, B. D. Elements of X-ray Diffraction, Addison-Wesley Publishing Company, INC, 1978.) The results of the calculation are summarized in Table 2 (Based on peak at 2θ=47.0°):

TABLE 2

|  | Er % | $CaF_2$ crystal size (nm) |
|---|---|---|
| Comp. 2 | 0 | 24.0 |
| Ex. 1 | 5% | 15.1 |
| Ex. 2 | 10% | 12.5 |
| Ex. 3 | 20% | 11.2 |

These results showed that doping with Er reduced the $CaF_2$ crystal particle size. The CaF2 particle morphology was also modified by Er doping.

Example 4

Figure 5:
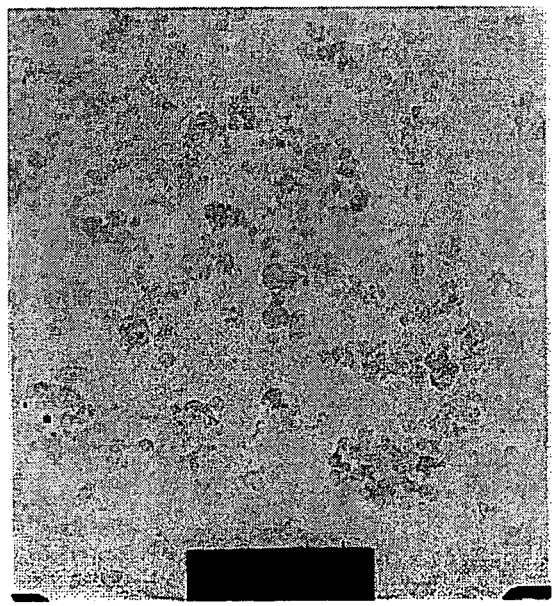
FIG. 5 is a transmission electron micrograph of the Er/Yb-doped $CaF_2$ particles prepared in Example 4.

42.5 ml of 0.4 M $CaCl_2$ solution was mixed with 2.5 ml 0.4 M $ErCl_3$ solution and 5 ml 0.4 M $YbCl_3$ in a 250 ml polycarbonate flask. The thus prepared solution was then slowly added with vigorous stirring to another 250-ml polycarbonate flask containing 53.75 ml 0.8 M NaF solution. The addition was completed in three minutes. The resulting colloidal suspension was stirred for 30 min followed by ultrasonic agitation using the Brason bath for 25 min. 1 ml of the dispersion thus formed was diluted to 30 ml by adding deionized water and analyzed by TEM. By visual estimation, d50 was under 40 nm as shown in FIG. 5

The remainder of the colloidal sol was centrifuged at 7500 rpm for 30 min. The supernatant liquid was decanted. The residual wet cake was collected in a glass jar and dried at 135° C. under vacuum with a nitrogen purge. The thus dried sample was placed in an air furnace (Fisher Scientific Isotemp Programmable Furnance Model 497), the furnace was heated to 400° C., and the sample was held at 400° C. for 2 hours. The cooled sample was then ground into fine powder using a mortar and pestle.

The luminescence lifetime of the 1540 nm emission of the powder thus prepared was determined. Excitation was performed using a 975 nm laser diode pulsed with a 9 hertz square wave. A wavelength division multiplexer and two longpass filters were used to ensure the removal of any residual 975 nm pump source from the luminescence signal at 1540 nm. An indium gallium arsenide, photodiode was used as the photodetector. The emission was observed to be bi-exponential, according to the equation $$y = Ae^{-\frac{t}{\tau_1}} + Be^{-\frac{t}{\tau_2}} + c$$

The weighted average lifetime was 0.876 ms.

A weighted average luminescence lifetime of greater than 15 ms was observed when the sample which had previously been heated to 400° was then further heated in the same equipment at 800° C. for 2 hours.

Examples 5-8 and Example 17

Comparative 0.3 M $CaCl_2$ solution was mixed with 0.3 M $TbCl_3$ solution in a 250 ml polycarbonate flask in the amounts shown in Table 3. This mixed solution was then poured into a 500 ml polycarbonate flask containing 0.6 M NaF solution with vigorous stirring. The amount of 0.3 M NaF solution in each example is also shown in Table 3.

TABLE 3

|  | Tb % | 0.3 M $CaCl_2$ solution (ml) | 0.3 M $TbCl_3$ solution (ml) | 0.6 M NaF solution (ml) |
|---|---|---|---|---|
| Comp. Ex. 17 | 0 | 80 | 0 | 80 |
| Ex. 5 | 2% | 98 | 2 | 101 |
| Ex. 6 | 5% | 95 | 5 | 102.5 |
| Ex. 7 | 10% | 90 | 10 | 105 |
| Ex. 8 | 20% | 80 | 20 | 110 |

The addition of the respective metal chlorides into the respective sodium fluoride solutions was completed in 30-60 seconds. The resulting colloidal suspensions were each stirred for 2 min followed by ultrasonic agitation for 30 min using the Branson bath. The colloidal sols were allowed to stand for 2-3 hours, then centrifuged at 7500 rpm for 35 min. The supernatant liquid was decanted. Each residual wet cake was then divided into two parts.

Figure 6:
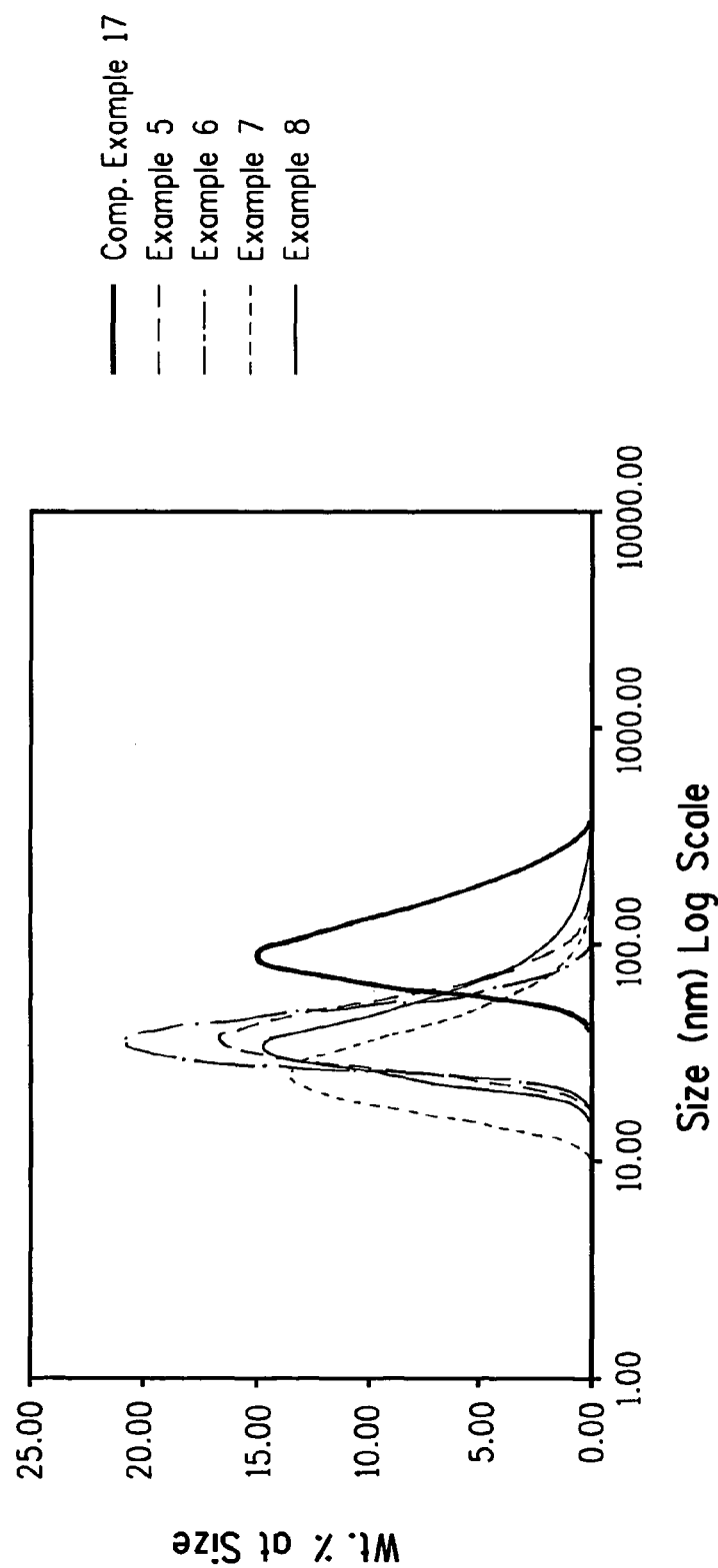
FIG. 6 compares the particle size distributions of the particles prepared in Comparative Example 17 and in Examples 5-8.
Figure 7:
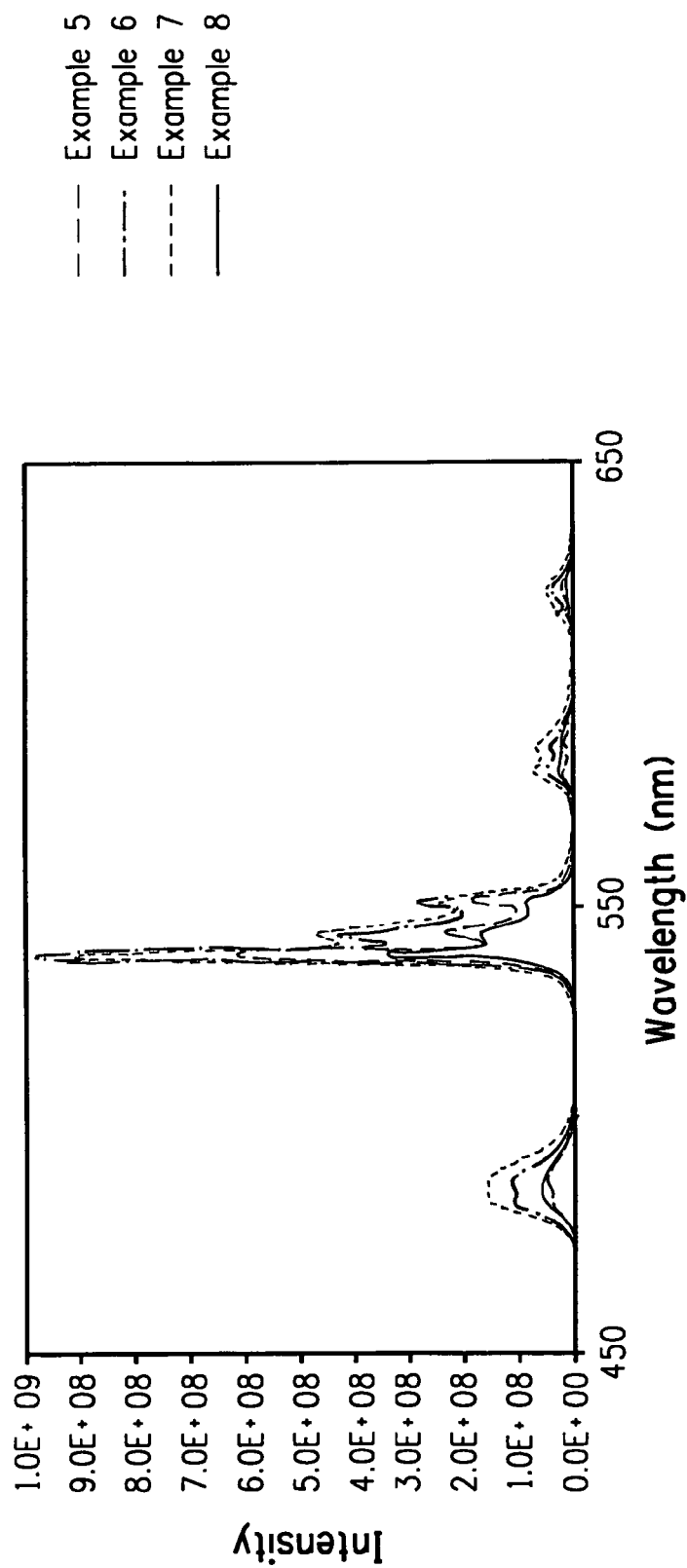
FIG. 7 compares the luminescence spectra of the particles prepared in Examples 5-8.

About 1.6-4.2 g of each wet cake was transferred into a 50 ml plastic tube after which deionized water was added to make the final volume 45 ml. The mixture was then ultrasonically agitated with a micro-tip ultrasonic probe (VibraCell, Sonics & Material, Danbury, Conn., USA) for 3 min. Each of the thus prepared dispersions showed green luminescence when excited with 254 nm UV light from a UV lamp (Ultraviolet Lamp, UVP, UVGL-58) as shown in FIG. 7. The particle size distribution in the dispersions was determined by dynamic light scattering using a Zetasizer (Malvern Zetasizer Nano-S). Results are shown in Table 4 and FIG. 6. The dispersions were further subject to ultrasonic agitation for 2 min using a regular-tip (half inch) Vibra-Cell® probe just before particle size measurement. D10 means that 10% of the particles, by volume, were smaller than the indicated size; d50 means that 50% of the particles by volume were smaller than the indicated size; and, d90 means that 90% of the particles were larger than the indicated size.

The remaining portions of the wet cakes were respectively transferred into a glass jar and dried overnight at 100° C. in a $N_2$-purged vacuum oven. The thus dried cake was ground into fine powder. Luminescence spectra were measured with excitation of 256 nm UV light. The results are shown in FIG. 7.

Example 9

Figure 8:
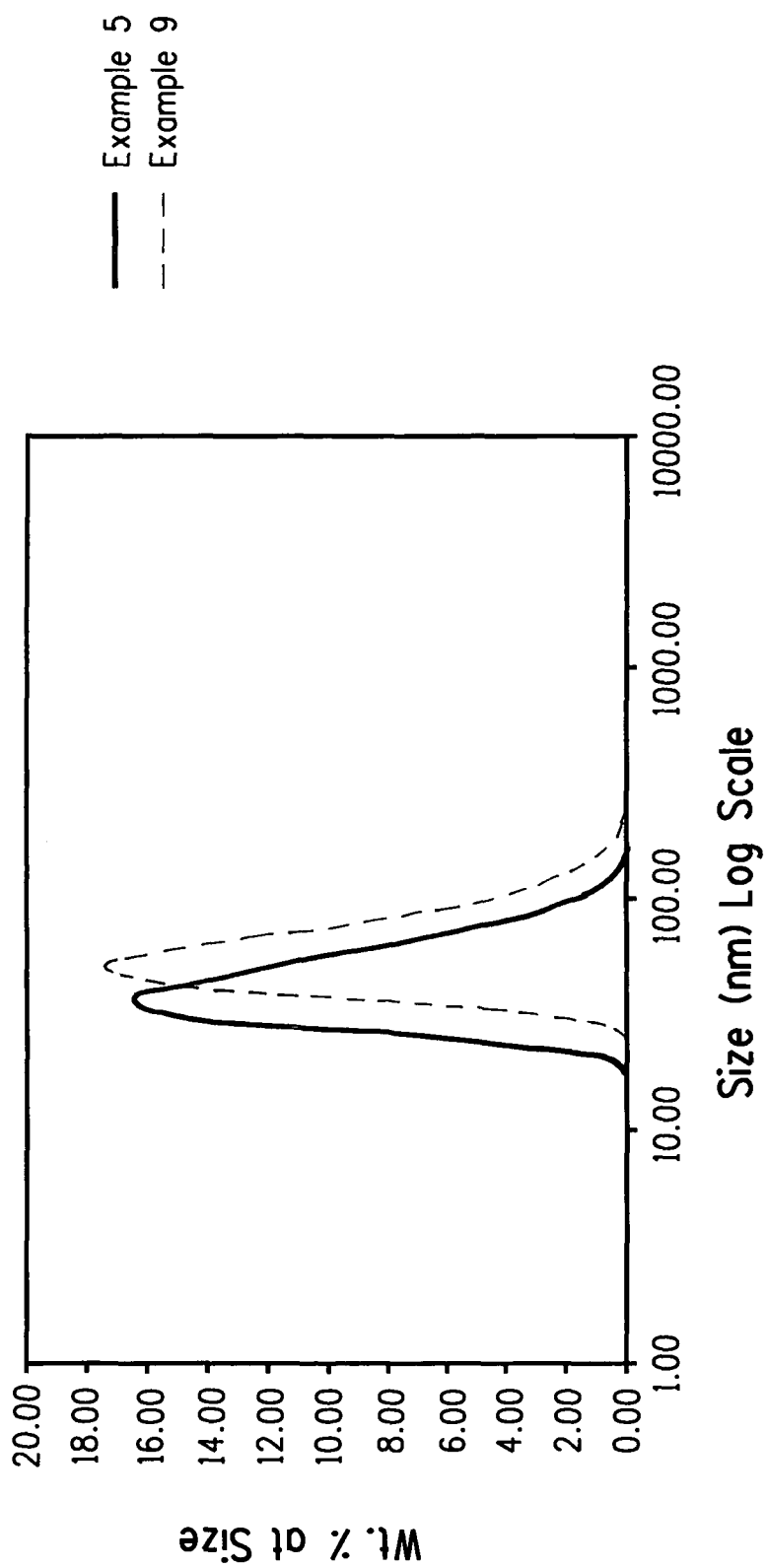
FIG. 8 compares the particle size distribution of the particles prepared in Example 5 with those prepared in Example 9.
Figure 9:
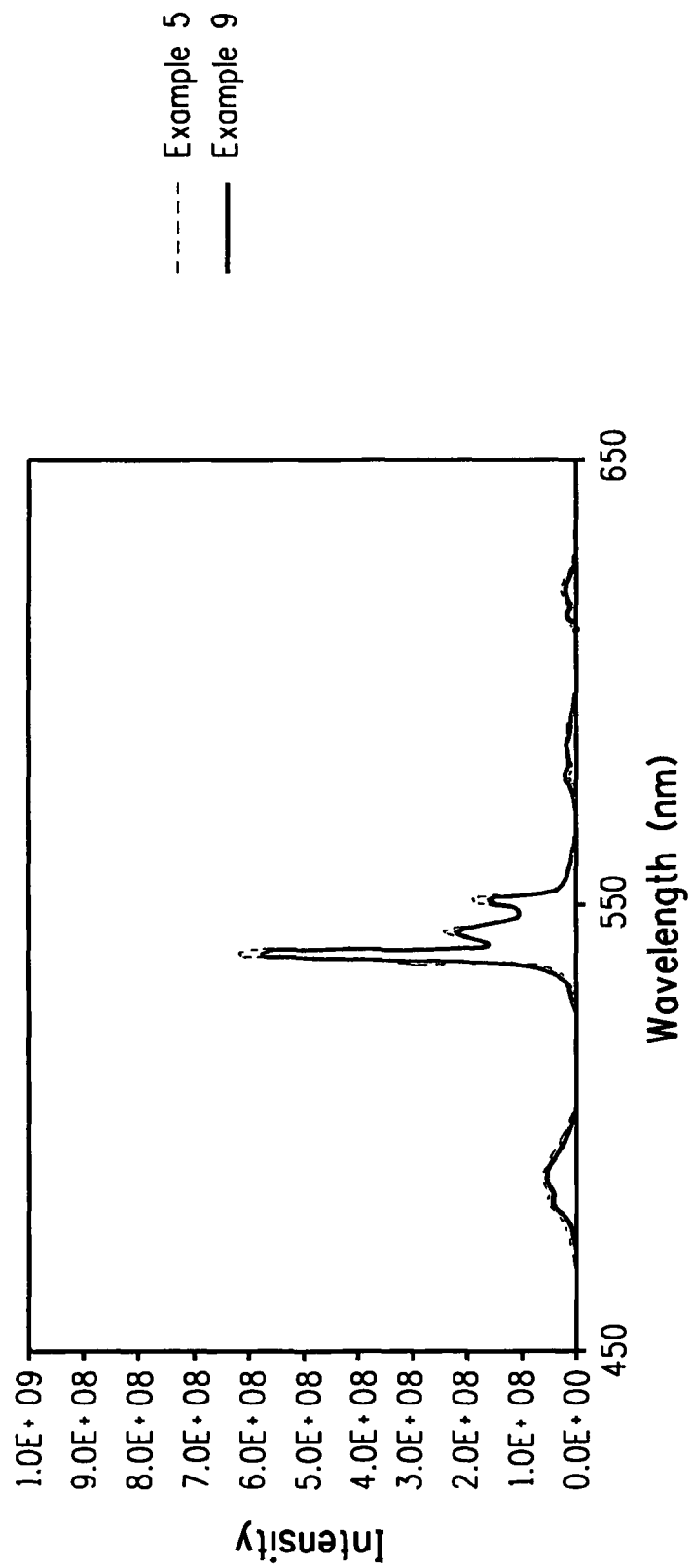
FIG. 9 compares the luminescence spectra of the particles prepared in Example 5 with those prepared in Example 9.

The materials and procedures were the same as in Example 5, but the order of addition was different. In this example, the NaF solution was added to the metal chloride solution instead of adding the metal chloride solution to the NaF solution as in Example 5. The particle size distribution and luminescence spectrum were also obtained for the specimen so prepared and are shown in Table 4, FIG. 8 and FIG. 9 for comparison. The dispersed colloidal sols in this example also showed green fluorescence when excited with 254 nm UV light using the UV lamp as shown in FIG. 9.

TABLE 4

| Example | d10 (nm) | d50 (nm) | d90 (nm) | Average Size (nm) |
|---|---|---|---|---|
| Comp. Ex. 17 | 71.7 | 109.9 | 203.2 | 121.2 |
| Ex. 5 | 29.3 | 43.4 | 74.0 | 58.2 |
| Ex. 6 | 29.1 | 40.2 | 58.7 | 49.7 |

TABLE 4-continued

| Example | d10 (nm) | d50 (nm) | d90 (nm) | Average Size (nm) |
|---|---|---|---|---|
| Ex. 7 | 18.6 | 30.2 | 57.4 | 50.4 |
| Ex. 8 | 27.5 | 42.4 | 87.2 | 73.2 |
| Ex. 9 | 40.3 | 58.7 | 98.5 | 73.2 |

Example 10

85 ml of 0.2 M $LaCl_3$ was mixed with 10 ml of 0.2 M $YbCl_3$ and 5 ml of 0.2 M $ErCl_3$ solution in a 250-ml container. This mixed metal chloride solution was then slowly poured with vigorous stirring into a 500-ml polycarbonate flask containing 100 ml of 0.6 M NaF solution. The addition was completed in 30 seconds. A colloidal Er, Yb doped $LaF_3$ sol was formed immediately. The colloidal sol was then subject to ultrasonic agitation for 20 min using an ultrasonic bath (Branson 1510). The sample was then divided into two aliquots of 100 ml each.

Figure 10:
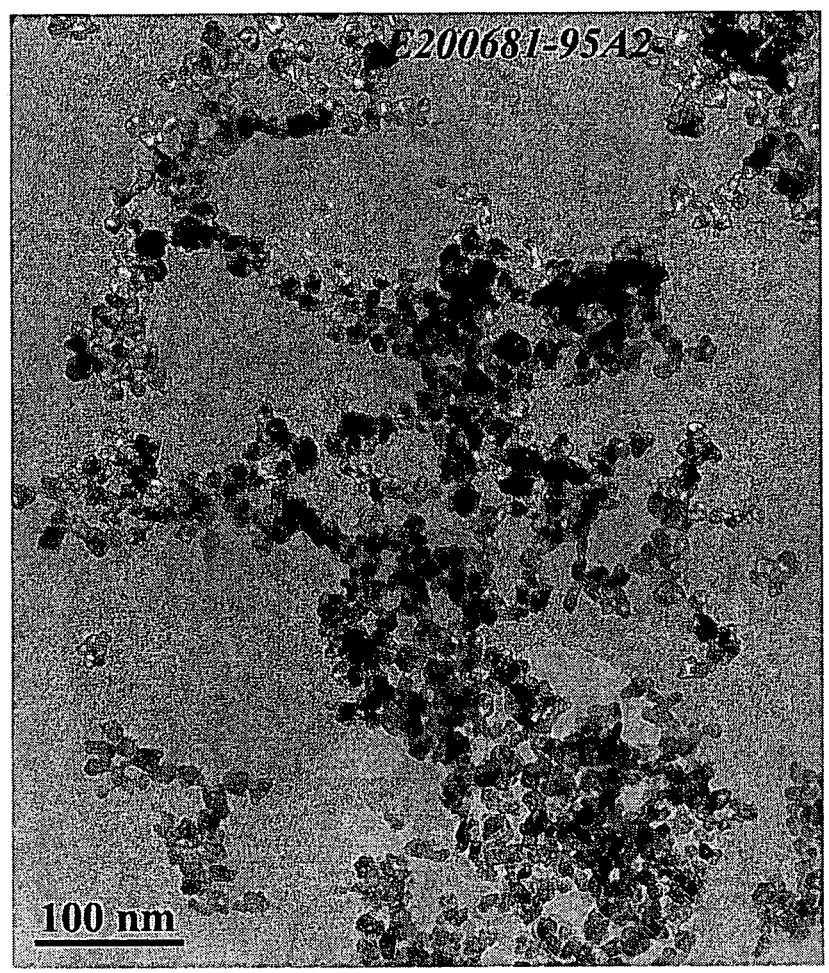
FIG. 10 is a transmission electron micrograph of the Er/Yb-doped $LaF_3$ particles prepared in Example 10.

One said 100 ml aliquot was transferred to a centrifuge tube. Deionized water was added to the tube to make the final volume about 300 ml. The thus diluted sol was then centrifuged at 7500 rpm for 30 min. The supernatant liquid was decanted. A small amount of the residual wet cake was re-dispersed back into water using a ultrasonic bath (Branson 1510) and then analyzed by TEM. The TEM result is shown in FIG. 10. By visual estimation, d50 was below 50 nm.

Example 11

Figure 12:
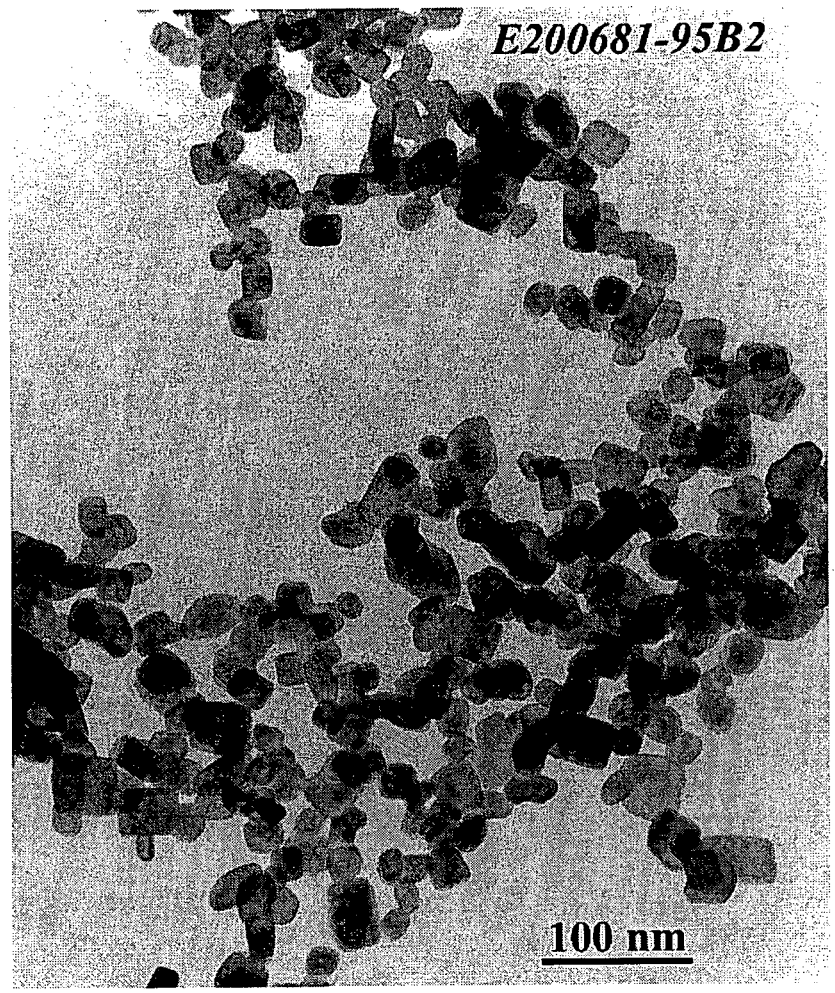
FIG. 12 is a transmission electron micrographs of the particles prepared in Example 11.

The second 100 ml aliquot prepared in Example 10 was diluted with 100 ml of deionized water in a 450 ml Parr 4562 (Parr Instrument, Moline, Ill.) titanium high pressure reactor equipped with stirring blades. The reactor was sealed, the stirring rate was set to 250 rpm, and the temperature gradually raised to 220° C. The reactor was held at that temperature for 20 min. The heating was then shut down and the sealed reactor was allowed to cool down to below 60° C. The reactor was then opened and the slurry contained therein was transferred to a 250 ml plastic flask and allowed to settle overnight. The slurry separated spontaneously into a high solids bottom layer, and a clear supernatant liquid, approximately 100 ml in volume. The supernatant was removed using a pipette. The final volume of the remaining high solids layer was about 100 ml. The high solids layer was then transferred into a centrifuge tube. Deionized water was added to the tube to make the final volume about 300 ml. The diluted slurry so prepared was then centrifuged at 7500 rpm for 30 min. The supernatant was decanted. A small amount of residual wet cake was re-dispersed back into water using a supersonic bath (Branson 1510). The re-dispersed sol so formed was transparent and stable for several months. The thus formed re-dispersed sol was analyzed by TEM, shown in FIG. 12. By visual estimation, d50 was below 75 micrometers.

Figure 11:
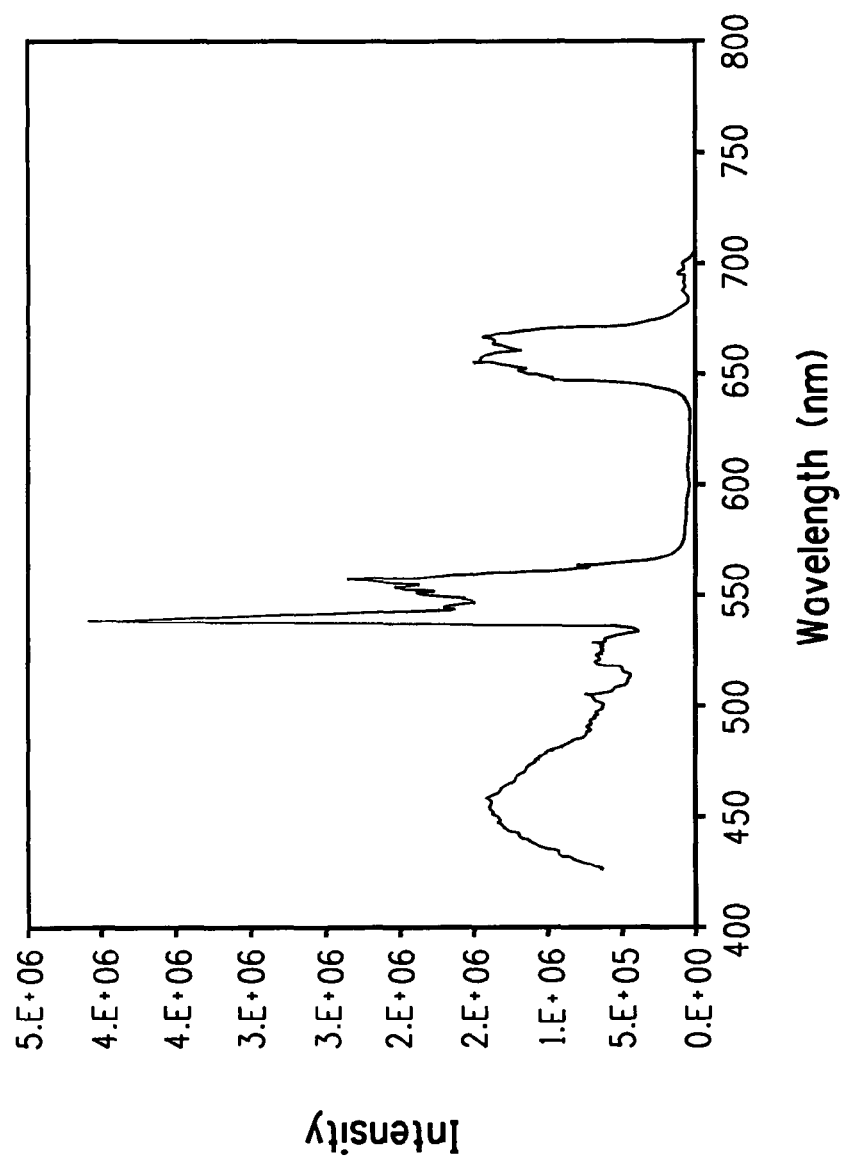
FIG. 11 is a luminescence spectrum of the Er/Yb-doped $LaF_3$ particles prepared in Example 11.

The remainder of the wet cake was dried overnight at 135° C. in an $N_2$-purged vacuum oven. The luminescence spectrum of the thus dried powder was determined at 376 nm excitation wavelength as above and is shown in FIG. 11.

Example 12

5.79 g of $MgCL_2.6H_2O$ was combined with 0.56 g of $TbCl_3.6H_2O$ in 100 ml of deionized water. The resulting solution was added over a period of 30-60 seconds to 102.5 ml of 0.6 molar $NH_4F$ in a 250 ml flask with while stirring. Stirring was continued for 2 minutes, followed by ultrasonic agitation for 30 minutes in the Branson bath. The resulting dispersion was centrifuged at 5000 rpm for 40 minutes in an Allegera 21 R model S4280 centrifuge (Beckman Coulter). The supernatant liquid was decanted. The residual cake was combined with an additional 180 ml of deionized water, shaken, and then subject to ultrasonic agitation for 3 min. using the Vibra-Cell®). The thus formed dispersion was centrifuged at 5000 rpm for 40 min. Again the supernatant liquid was decanted.

A portion of the residual cake was combined with 15 ml of deionized water by ultrasonic agitation using the Vibra-Cell® for 2 min. The resulting specimen was analyzed for particle size distribution using the Zetasizer™. The results were d10: 255.7/d50: 390.2

Example 13

Figure 13:
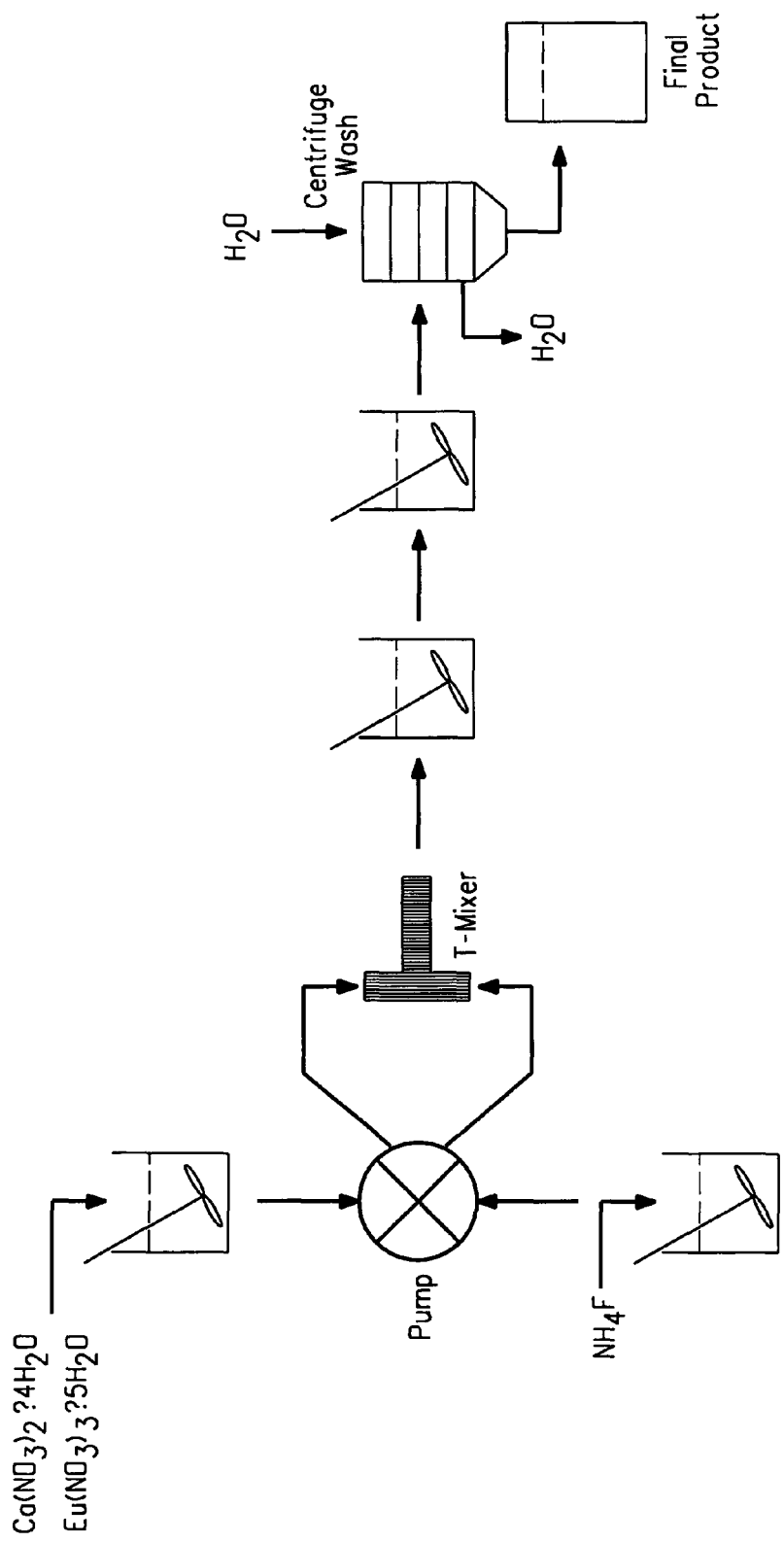
FIG. 13 is a flow diagram for the continuous process of Example 13.

In a polycarbonate Erlenmeyer flask, 13.886 g $Ca(NO_3)_2.4H_2O$ and 0.514 g $Eu(NO_3)_3.5H_2O$ were dissolved in 150 ml of deionized water with constant stirring. In a separate flask, 4.489 g of $NH_4F$ was dissolved in 150 ml of deionized water with constant stirring. The flasks were stirred until the metal salts dissolved, which was approximately 5 minutes. The two salt solutions were simultaneously fed into a T-mixer nozzle via silicone and Teflon® tubing using a peristaltic pump at a flow rate of ~10 ml/min. The process flow diagram is shown in FIG. 13.

A white precipitate was observed to form at the point in the T-mixer where the two salt solutions combined. The precipitate/water suspension was discharged into a stirred flask. The precipitate was kept in static contact with the mother liquor for ~24 hrs at ambient temperature. The resulting suspension was washed 3× by centrifuging (Sorvall RC5C, Thermo Electron Corp.) at a relative centrifugal force of 9500 xg for 40 min, removing the supernatant containing soluble salts, and redispersing the particles in clean, deionized water using ultrasonic agitation (Sonics and Materials, Inc, Danbury, Conn.) at 50 W/cm².

Figure 14:
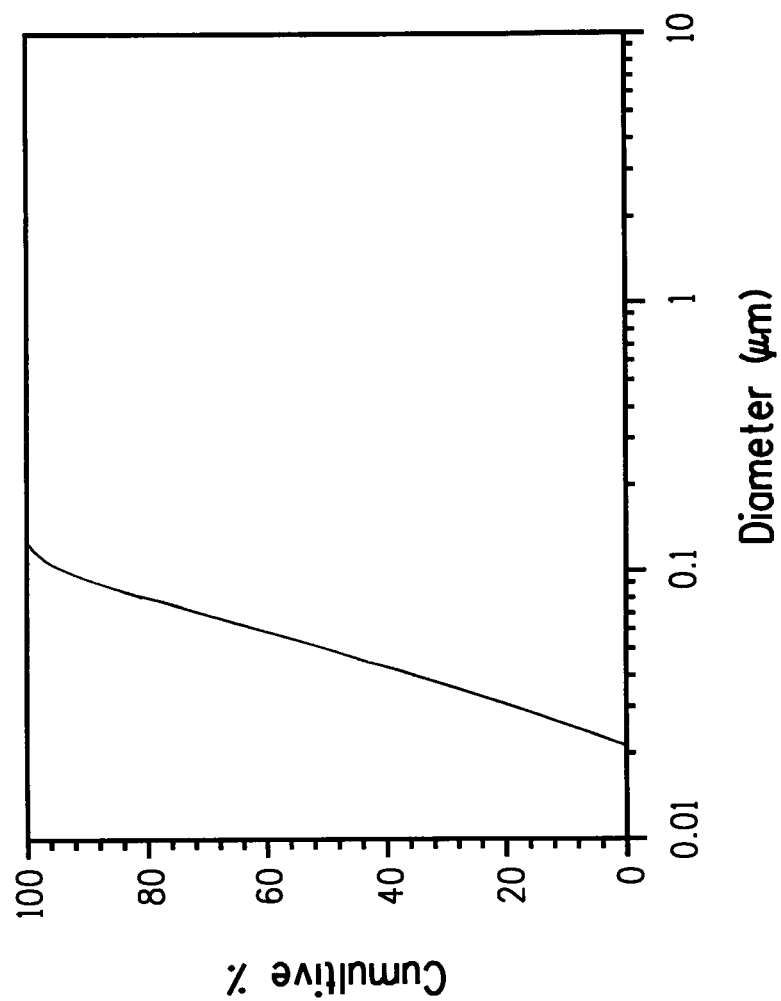
FIG. 14 is a particle size distribution result for the sample prepared in Example 13.

Particle size distribution was measured using a Horiba LA-910 (Horiba, Ltd, Kyoto, Japan) particle size analyzer. Volume diameter size distribution was measured by subjecting the as-precipitated/washed suspension to an ultrasonic horn (Sonics and Materials, Inc, Danbury, Conn.) at 50 W/cm² and then injecting a dilute aliquot into a fraction cell containing deionized water. FIG. 14 shows the particle size cumulative percent for the as-precipitated/washed sample using a refractive index of 1.37. The d50 was 57 nm.

Figure 15:
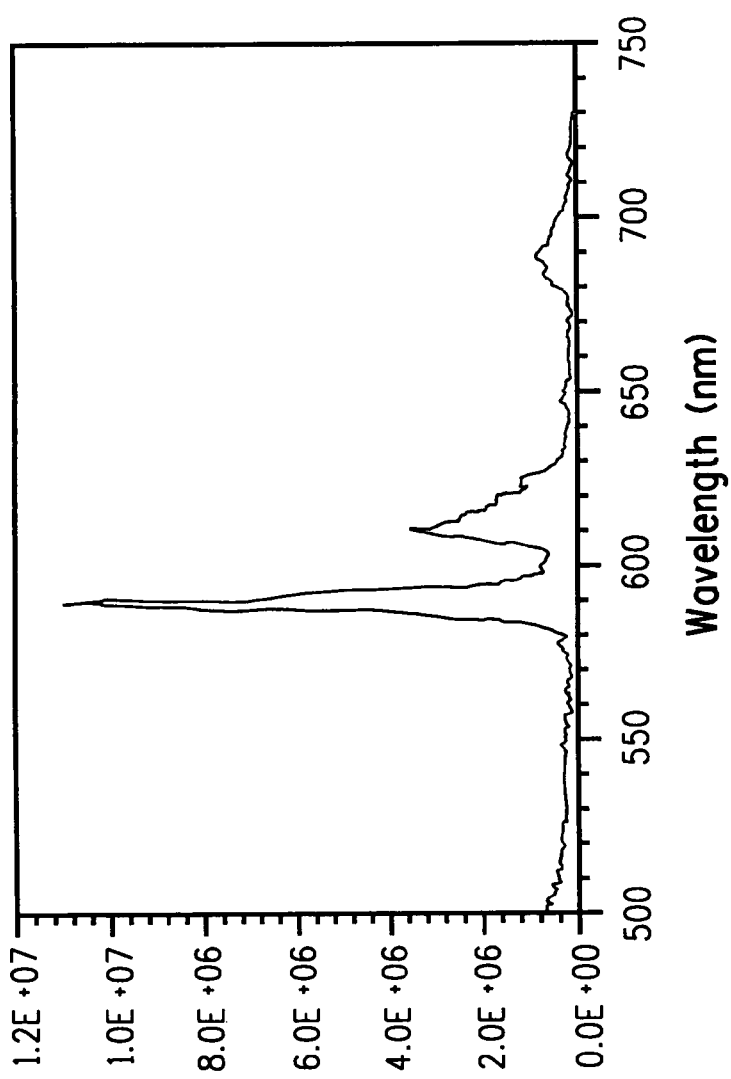
FIG. 15 is the luminescence spectrum of the sample prepared in Example 13.

Luminescence was measured as described above with the samples excited at 394 nm. The luminescence spectrum is shown in FIG. 15.

Example 15

Comparative 45 ml of 0.02 M NaF aqueous solution was added to a 250 ml polycarbonate flask. The solution was stirred using a magnetic stirring bar. 50 ml of 0.01 M $CaCl_2$ was added to the NaF in the flask, with vigorous stirring. The mixture was kept stirring for 10 min. Precipitation was observed. A small amount of precipitate was examined using a Nikon Optical Microscopy equipped with a digital camera. The particle size of $CaF_2$ particle was in the range of 1-3 micrometers as shown in FIG. 1. By visual estimation, d50 was greater than 1 micrometer.

Example 16

Figure 2:
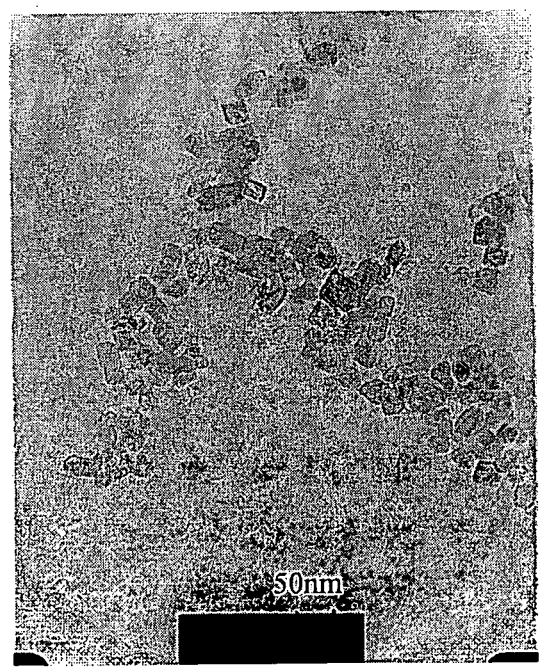
FIG. 2 is a transmission electron micrograph of the undoped $CaF_2$ particles prepared in Comparative Example 16.

Comparative 50 ml of 0.8 M NaF aqueous solution was added to a 250 ml polycarbonate flask. The solution was stirred using a magnetic stirring bar. 50 ml of 0.4 M $CaCl_2$ was added to the flask with vigorous stirring using a stirring bar. The addition was completed in three minutes. A $CaF_2$ colloidal sol was formed. The sol was then stirred for 30 min. A small amount of colloidal sol was diluted 30 times with deionized water and analyzed by transmission electron microscopy (TEM). The TEM image showed the particle size of the $CaF_2$ particles so formed was in the range of 20-70 nm (FIG. 2). By visual estimation, d50 was about 45 nm.

The rest of the colloidal suspension was centrifuged at 7000 rpm for 30 min. The supernatant liquid was decanted. The residual wet cake was collected in a glass jar and dried at 135° C. under vacuum with a nitrogen purge. The sample was then ground by pestle and mortar into powder and analyzed by powdered x-ray diffraction. (XRD). The results are shown in FIG. 3 which compares the XRD results of Examples 1-3 and Example 16.

We claim:

1. A process comprising reacting aqueous solutions consisting essentially of an aqueous solution of one or more fluorides with an aqueous solution of a host multi-valent metal salt and one or more rare-earth salts to form aqueously insoluble rare-earth doped multi-valent metal fluoride nanoparticles characterized by d50<100 nanometers, the rare-earth doped multi-valent metal fluoride being characterized by an aqueous solubility of less than 0.1 g/100 g of water; wherein the concentrations of the solution of the one or more fluorides and the solution of the host multi-valent metal salt and the one or more rare earth salts are in stoichiometric amounts forming a rare-earth doped multi-valent metal fluoride, and the aqueous solution of one or more fluorides and the aqueous solution of a host multi-valent metal salt and the one or more rare-earth salts are independently at least 0.1 normal; wherein the relative concentration of the rare earth cation with respect to that of the multi-valent metal cation is in the range of 2 to 20% on a molar basis; and, wherein the fluoride is selected from alkali metal fluorides, ammonium fluoride, hydrogen fluoride, or mixtures thereof.

2. The process of claim 1 wherein the multi-valent cation is selected from the group consisting of $Ca_{+2}$, $Mg_{+2}$, $Sr_{+2}$, $Y_{+3}$, $La_{+3}$, $Ac_{+3}$, $Cr_{+3}$, $Mo_{+3}$, $Ir_{+3}$, $Cu_{+2}$, $Ga_{+3}$, $Pb_{+2}$, $Ce_{+3}$, $Nd_{+3}$, $Eu_{+3}$, $Er_{+3}$, $Yb_{+3}$, and $Lu_{+3}$.

3. The process of claim 2 wherein the host multi-valent metal cation is $Ca_{+2}$ or $La_{+3}$.

4. The process of claim 1 wherein the aqueous solution of a fluoride is an aqueous ammonium fluoride solution.

5. The process of claim 1 wherein the concentration of the host multi-valent metal cation salt is about 0.8 normal.

6. The process of claim 1 further comprising a batch process wherein the reaction mixture is formed in a vessel.

7. The process of claim 1 further comprising a continuous process wherein the reaction mixture is formed in a mixing chamber fed by continuous feed streams of reactants.

\* \* \* \* \*